United States Patent

Horne

[15] 3,657,545

[45] Apr. 18, 1972

[54] METHOD AND APPARATUS FOR REPRODUCING A PATTERN FROM ONE PLANAR ELEMENT UPON ANOTHER PLANAR ELEMENT

[72] Inventor: Douglas Favel Horne, Beaconsfield, England

[73] Assignee: The Rank Organization Limited, London, England

[22] Filed: Oct. 24, 1968

[21] Appl. No.: 770,250

[30] Foreign Application Priority Data

Oct. 27, 1967 Great Britain ....................49,009/67
Apr. 19, 1968 Great Britain ....................18,746/68

[52] U.S. Cl. ....................250/201, 29/579, 250/219 DR, 250/224, 250/237 R, 356/169, 356/172

[51] Int. Cl. ....................G01j 1/20

[58] Field of Search ....................29/579, 578; 250/201, 219 R, 250/224; 356/237, 169, 172

[56] References Cited

UNITED STATES PATENTS 3,029,348 4/1962 Heinz ....................356/172 X
3,038,369 6/1962 Davis ....................250/201
3,330,964 7/1967 Hobrough ....................250/237
3,423,597 1/1969 Delp ....................250/237 X

*Primary Examiner*—James W. Lawrence
*Assistant Examiner*—C. M. Leedom
*Attorney*—Baldwin, Wight & Brown

[57] ABSTRACT

The specification relates to a method and means for the reproduction by a photo-printing process of a pattern from a master or mask plate onto a planar workpiece, the arrangement being intended particularly for use with the high accuracy requirements for building up of successive layers of a microcircuit, both in terms of location of the pattern and in the standard of reproduction of elements of the pattern. In the described form of the invention, the reproduction is performed while maintaining a spacing between the mask plate and the workpiece and a collimated beam of light is used to expose the workpiece to the mask plate pattern. Photo-electric microscope means provide a suitably precise form of automatic location to ensure that successive layers of the microcircuit can be applied in register with each other and approximate location means are combined with a transfer mechanism for loading the mounting devices. The mounting devices are capable of relative adjustment for alignment of the fiducial marks on the elements, for varying the spacing of the elements and for correcting non-parallelity between the adjacent faces of the elements.

16 Claims, 5 Drawing Figures

Inventor:
Douglas Favel Horne
By his attorneys,
Baldwin, Wight, Diller + Brown

Inventor:
Douglas Favel Horne
By his attorneys,
Baldwin, Wight, Diller + Brown

Inventor:
Douglas Favel Horne
By his attorneys,
Baldwin, Wight, Diller + Brown

Inventor:
Douglas Favel Horne
By his attorneys,
Baldwin, Wight, Diller + Brown

METHOD AND APPARATUS FOR REPRODUCING A PATTERN FROM ONE PLANAR ELEMENT UPON ANOTHER PLANAR ELEMENT

This invention relates to apparatus for and a method of reproducing a pattern on one planar element onto another planar element. It is concerned particularly, although not exclusively, with the production of microcircuits using such apparatus and/or method.

The production of microcircuits demands exacting manufacturing techniques since the products are characterized not only by their small finished size but also by the very fine dimensional tolerances to which they must conform.

It is known to prepare a microcircuit by building up successive solid-state sub-circuits on a base member, typically a silicon wafer, the circuit characteristics being determined by shapes of the sub-circuits and the locational relationships between them. A known technique for forming each sub-circuit on the base member involves the use of a master mask plate carrying the sub-circuit pattern and which is placed against a photo-resist coating on the base member, the coating then being processed after exposure to retain the sub-circuit pattern on the base member in metallised form, e.g., as a silicon or an oxide layer.

It will be clear that as successive sub-circuit layers are built up on the workpiece, the positioning of each successive master relative to the preceding sub-circuits already on the workpiece must be maintained to very close tolerances if the completed circuit is to have its desired characteristics.

A further difficulty arises from the fact that the mask plate is placed in contact with the silicon slice forming the workpiece for the exposure of the photo-resist coating on the slice and it is found that surface irregularities in the layers formed on the workpiece as successive circuit patterns are built up can easily damage a master so creating faults in the patterns formed on the workpiece and severely limiting the life of the master.

The present invention provides apparatus for reproducing a pattern from one planar element upon another planar element by the transmission of a collimated beam of radiant energy through said one element onto the other element and comprising respective mounting devices for the two elements arranged to maintain the elements in parallel planes out of contact with each other and photo-electric microscope means arranged to sense fiducial marks on the two elements, at least one of the mounting devices being displaceable parallel to the planes of the two elements in dependence upon the sensing signals from the microscope means for relative adjustment of the elements to align their fiducial marks.

The use of photo-electric sensing means for the relative location of the articles is of considerable advantage since it is possible to provide a relatively large depth of focus and therefore adjustments of level due to the spacing apart of the two articles need not produce any problem in that the settings of the microscopes means need not be disturbed between the readings of the marks on the two elements.

The invention can also provide a method for reproducing a pattern from a first planar element upon a second planar element comprising the steps of deriving a location datum by sensing fiducial marks on the first element through photo-electric microscope means, placing the second element in its approximate location in a plane parallel to the first element such that a spacing is maintained between the two elements, sensing fiducial marks on the second element and employing any misalignment between the sensed position of said marks and the location datum to bring the second element marks towards said datum, and after correction of said misalignment, transmitting a collimated beam of radiant energy through one of the elements to reproduce a pattern thereon upon the other of the elements.

For the successful application of the invention, it is necessary to copy the pattern from a master or master plate having a high degree of flatness—preferably an optically smooth (i.e., with a maximum deviation of about 0.001 mm in 75 mm) glass base is used having a considerable thickness, preferably 8 mm or more. The pattern is formed as a thin layer on the flat surface and conveniently a suitable layer only some 1,000–1,500 angstrom units deep, can be produced by vacuum deposition of a metal, conveniently chromium, on the base surface.

The silicon slice is given a positive or negative resist coating to receive the illumination pattern projected from the mask plate. The gap between the chromium-plated surface of the mask plate and the resist-coated surface of the slice need only be relatively small, say less than 0.025 mm and preferably is varied to cater for the effects of edge diffraction phenonema from the mask plate pattern on different width lines in the pattern since the pattern lines may have a width of 0.004 mm or less.

These diffraction phenonema are also affected by the degree of collimation of the light exposing the resist coating and in the conditions given above, it is found that angle of spread of between one-half degree and 1° defines an optimum collimation standard.

For the sighting of the fiducial marks, it is necessary to ensure that the photo-electric microscope illumination does not expose any part of the photo-resist coating that is to receive a pattern from the mask plate. The resist coating may be sensitive only to radiation having a wavelength less than 5,000 angstrom units and it is then possible to use a longer wavelength light for the photo-electric microscopes, e.g., an amber filter can keep the illumination to wavelengths of 6,000 angstrom units or greater. This procedure has an advantage in that commercially available photo-cells tend to be more sensitive to radiation at the red end of the visible spectrum and there is therefore no serious loss of sensitivity through use of the filter.

An embodiment of the invention will be more particularly described with reference to the accompanying drawings, wherein.

Figure 1:
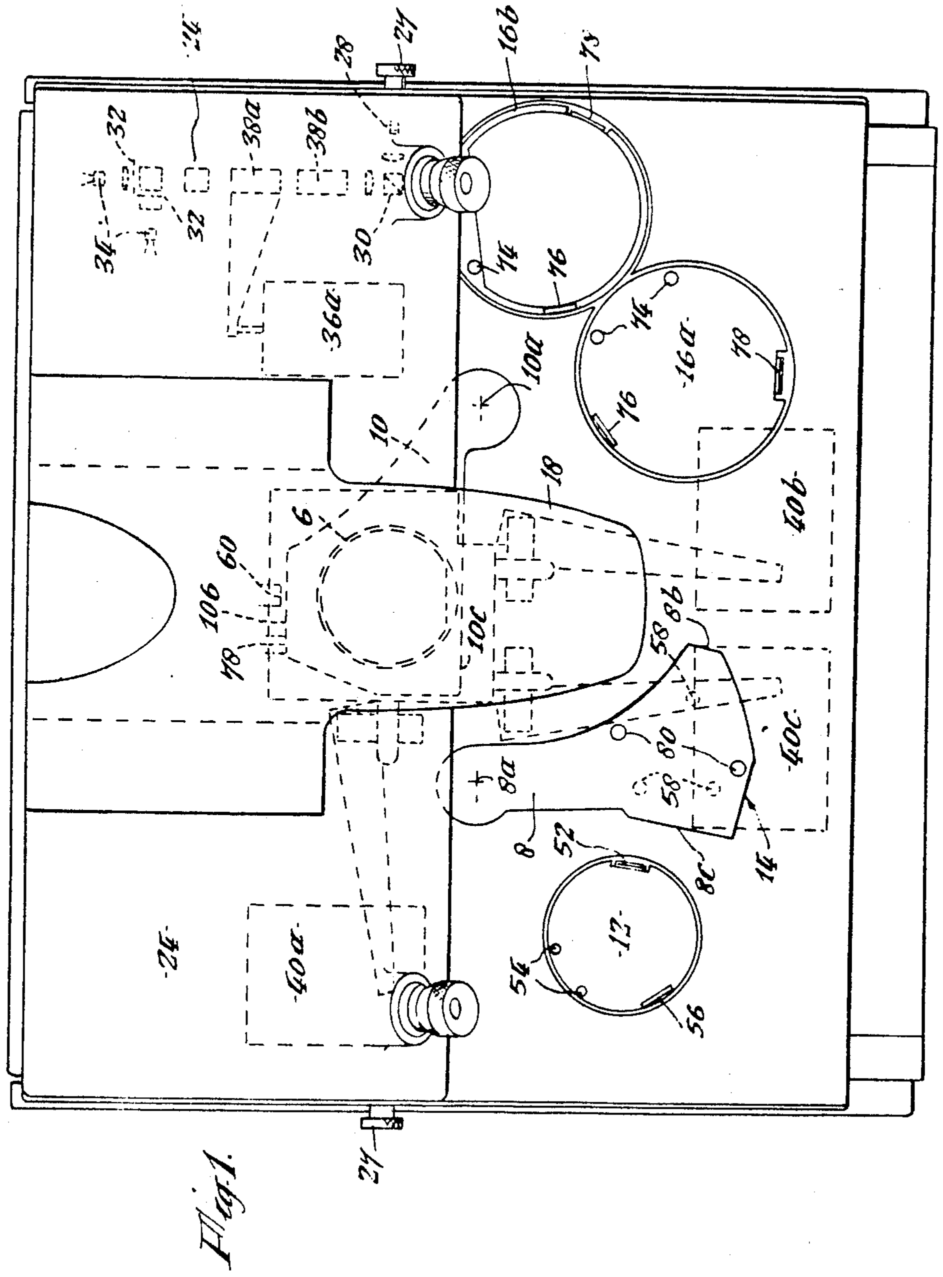
FIG. 1 is a plan view of apparatus according to the invention.
Figure 2:
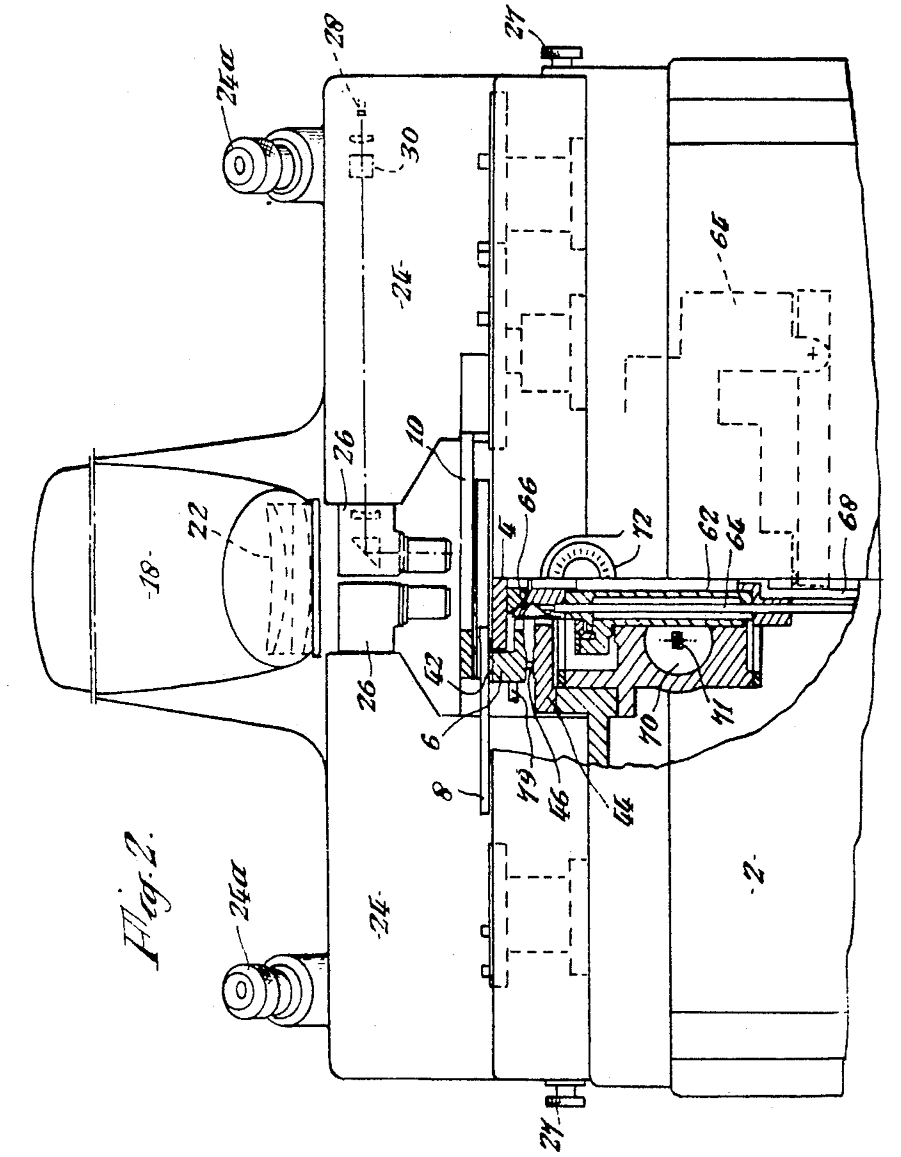
FIG. 2 is a partly sectioned front elevation of the apparatus in FIG. 1.
Figures 3, 4:
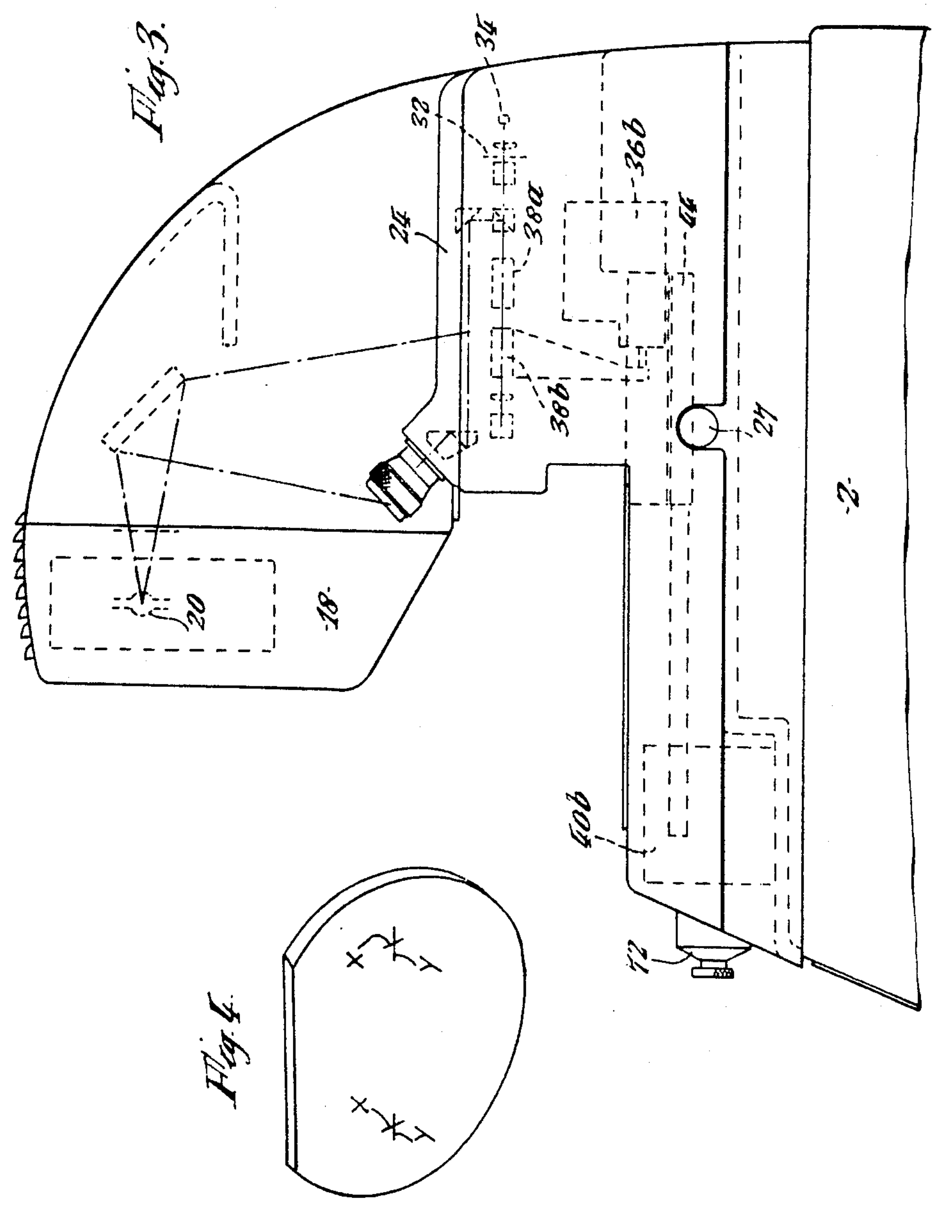
FIG. 3 is a side elevation of the apparatus in FIGS. 1 and 2 with the loading arms and stations omitted.
FIG. 4 illustrates a mask plate for use in the apparatus of FIGS. 1 to 3.

The machine illustrated in FIGS. 1 to 3 comprises a base unit 2 on which there is a central workpiece chuck or carrier 4 surrounded by an annular mask plate carrier 6. Respective transfer arms 8, 10 on pivots 8*a*, 10*a* are used to load and unload the carriers. The arm 8 is pivotable between a workpiece loading station 12 and the carrier 4 and has an intermediate position (in which it is illustrated in FIG. 1) over a workpiece reject station 14. The arm 10 can similarly pivot to move mask plates to and from either of a pair of alternative storage stations 16*a*, 16*b* and the carrier 6.

A fixed head 18 projecting in cantilever manner over the base unit carries a mercury vapor light source 20 from which light is projected through a collimating lens system 22 to illuminate the area of the carrier 4. Respective photo-electric microscopes 24 are provided in opposite sides of the carriers 4, 6 and each has a projecting objective unit 26 that is axially displaceable from the extended operative position illustrated in FIG. 2 to a retracted position in which they do not obstruct the illumination of the area of the carrier 4 by the collimated beam from the source 20. Their separation in the extended positions is adjustably set by controls 27.

The two microscopes are of identical form, the internal construction of only the right-hand microscope being shown in the drawings. Although the two microscopes are shown having eyepieces 24*a* through which an operator can make any initial setting adjustment that may be required and can check the occurrence of faults, it may be preferred to replace these with a projection screen so that the observations can be made more conveniently and so that there is less likelihood of disturbing the operation of the apparatus because of the proximity of the operator. Each microscope has an illumination source 28 incorporating an amber filter, light projected from the source to the carriers 4, 6 being arranged to provide illumination by reflection from fiducial marks on planar elements mounted on the carriers, said reflected light being returned through the microscope to a beam splitter 30 where, in each of two exit paths are respective vibratory screens 32 placed before photocells 34.

The fiducial marks on the mask plate and on the silicon slice are of identical form and disposition and are illustrated in FIG. 4. They are produced as interruptions some 0.01 mm wide in a reflecting chrome surface on each planar element and take the form of two mutually perpendicular linear elements X, Y at each of two laterally opposed regions of the surface. Although the elements of each pair are shown intersecting, this is not an essential feature since they each provide a separate signal in the photo-electric microscope. This is arranged by giving each screen 32 a linear form slit and orientating the screens perpendicular to each other so that the two photocells can receive illumination from different ones of the two linear elements.

It is found that when an elongate cut-out of small width is viewed, the reflected illumination is in the form of a pair of relatively bright lines, produced by diffraction at the edges of the cut-out, separated by a darker region. The microscope screens 32 are therefore each formed to ensure that the pair of bright lines provided by each mark element are both sensed and this has, in effect, an averaging influence which reduces potential errors due to inadvertent dimensional variations in the fiducial marks.

Any misalignment between the mean position of a screen and the associated part of the fiducial mark pattern reflected from an element can be arranged to operate the appropriate one of a pair of servomotors 36*a*, 36*b* to tilt one of a pair of refractory blocks 38*a*, 38*b* so that the reflected image of the fiducial mark at the screen 32 is brought into alignment with the screen aperture or apertures. Alternatively, servomotors 40*a*, 40*b*, 40*c* can be operated to adjust the position of the element carrying the marks. Both forms of correction are used at different stages in the working cycle of the illustrated apparatus as will be made clear in the description of its operation.

In use, a silicon slice having the general form of the planar element illustrated in FIG. 4, is placed on the station 12 and, by means of a feeler 52 a predetermined light pressure is applied to bring its straight edge against a pair of circular stops 54 and a part of its curved edge against a further fixed stop 56. The arm 8 is then swung over the station until its locating edge 8*c* abuts the stops 54. The arm is lowered and a suction is applied from a source (not shown) to three pads 58 on the underside of the arm to grip the silicon slice. The slice is raised by the arm and is pivoted to the position of the carriers 4, 6 the end position of the arm then being determined by its edge 8*b* abutting against a fixed stop 60.

At this stage the arm 8 is lowered to bear against three spaced support pads 42 on the top face of the carrier 6 against which it is pulled firmly by suction through apertures (not shown) in the pads. The slice is then suspended substantially coaxially over the inner carrier 4 at a level above its eventual working level. The carrier 4 is now raised on its cylindrical supporting column 62 by means of a solenoid-operated mechanism 64 to contact the underside of the device with the light load (approximately 100 gm.). During this operation, pressure air is being supplied through line 64 to a spherical air bearing 66 so that the carrier 4 can align itself to the bottom face of the slice as it is urged against it.

The bearing air pressure is now released and suction applied through line 68 to hold the slice against the carrier, while the supporting column 62 of the carrier is clamped by a pair of circumferentially spaced gripping members, one of which is indicated at 70, operated by a toggle linkage 71 through solenoids (not shown). The slice is disengaged from the arm 8 by cutting off the suction to the pads 58. By operation of the mechanism 64 the slice is lowered with the carrier by a distance determined by the setting of a control scale 72 on the front face of the apparatus (which varies the bottom stop position of the mechanism 64), the spacing between the upper surface of the slice and the lower surface of the mask (as ruled by the level of its supporting face on the carrier 6) thereby being set.

The mask plate will already have been positioned on one of the stations 16*a*, 16*b* (in a similar manner to the preceding positioning of the slice upon the station 12) using stops 74, 76 and feeler 78 of the associated station. When the arm 8 has been swung away from the carriers 4, 6, the mask plate is transferred to the carrier 6 by the arm 10, which has a locating edge 10*c* that can bear on either of the pairs of stops 74 as required, and an edge 10*b* that can be brought against stop 78. When the arm is lowered to rest the mask plate on the carrier 6, the plate can be held to the carrier location pads 42 by the application of suction in the same manner as the retention of the arm 8 was previously achieved.

With the objective units 26 of the microscopes retracted, the light source 20 can be operated to expose the resist coating on the slice to the pattern of the mask plate. If the workpiece has a negative resist coating, during this period a purging flow of an inert gas, such as nitrogen, is delivered through line 79 to the space between the slice and the mask plate to prevent oxidization of the resist coating. The mask plate is then returned by the arm 10 to its storage station and the exposed slice is transferred by the arm 8 to the reject station 14 from which it is taken for developing the exposure pattern and, after such further processing as is required for that layer of the microcircuit, a further layer of resist is applied for a subsequent exposure.

In the foregoing description of the operation of the apparatus, the photo-electric microscope locating means have not been utilized since such action is not necessary during the exposure of the first resist layer on a workpiece. It is only for the second and subsequent layers that precise alignment is necessary to ensure that the superimposed patterns are correctly co-related to each other.

The first mask plate, however, includes in its pattern the fiducial marks illustrated in FIG. 4 and in this first layer operation they are reproduced on the slice.

In the formation of the second and subsequent layer exposures the marks are present on the lateral margins of the slice as a reflecting pattern, e.g., in the silicon or oxide deposit of the microcircuit layer, giving a similar illumination pattern to that of the mask plate chrome pattern.

The photo-electric microscope means operate in the following manner. When the silicon slice has been lowered to its working position, but before the arm 8 is swung away, the fiducial marks on its upper surface (which will not be covered by the resist coating in the second layer forming stage or subsequently) are illuminated through the light sources 20, the light passing through windows 80 in the arm 8, and the two individual elements of each cruciform mark are separately sensed by the screened photocells as described above. Any misalignment at this stage is corrected by rotation of the refractor blocks, movement of the refractor block 38*a* displacing the imaged mark parallel to the plane of FIG. 1 and movement of the block 38*b* providing a displacement parallel to the plane of FIG. 3. Thus, the silicon slice is not adjusted on its carrier but its position is used to determine a datum for the following alignment of the mask plate.

The mask plate, which has its pattern and fiducial marks on its bottom surface, is then placed upon its carrier 6 and the refractor blocks are now kept in their pre-set positions, misalignment sensed by the photocells 34 operating the servomotors 40*a*, 40*b*, 40*c* to move slides 42 pivoted to a fixed lower platen 44 to displace the carrier 6 on a rolling bearing 46. It will be noted that the mask plate material itself forms part of the optical path through which the marks are viewed. Since the slice is arranged to be viewed through the windows 80 of the arm 8, it is possible to arrange, by suitable choice of the material of the windows and its thickness, that the optical path length is substantially the same in each case and both sets of marks can therefore come within the depth of focus of the microscopes without requiring any resetting of the microscopes.

Figure 5:
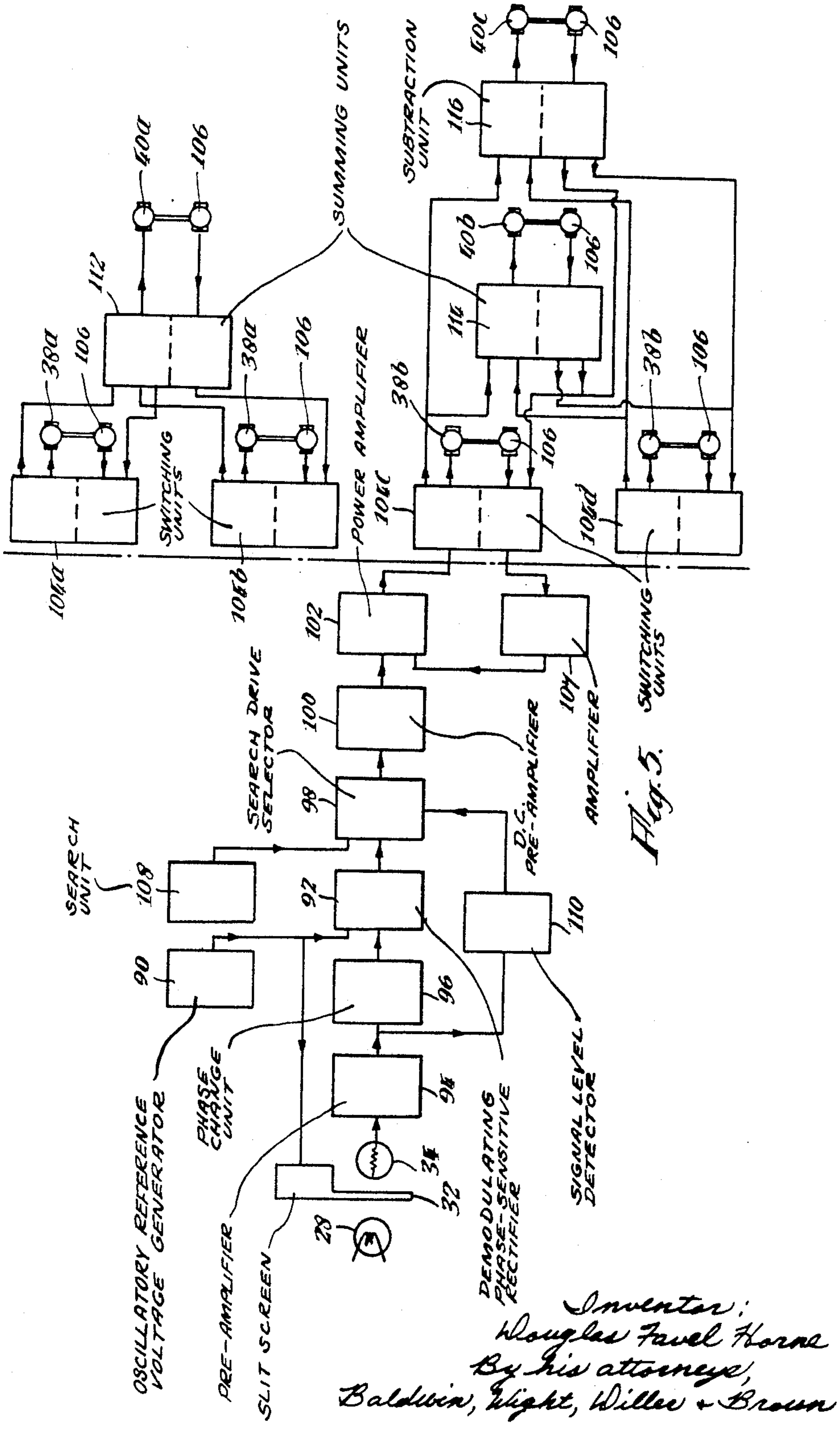
FIG. 5 is a schematic block diagram illustrating the manner in which setting corrections are applied by the photo-electric microscope means of the apparatus of FIGS. 1 to 3.

The control means for the alignment displacements of the fiducial marks is illustrated diagrammatically in FIG. 5. The production of driving error signals from the photocells is similar in each case and for simplicity, the drawing shows the circuit for one photocell only. There is also indicated the general manner in which the signals from the respective photocells are utilized to operate the different servomotors to produce the appropriate resultant corrections.

An oscillatory reference voltage generator 90 excites the vibratory slit screen 32 and provides a synchronized reference signal to a demodulating phase-sensitive rectifier 92. When illumination from the fiducial mark element parallel to the slits in the screen falls upon the slits an oscillatory light signal is transmitted to the photocell 34 and the resultant electrical output is directed through a pre-amplifier 94 to a phase-change unit 96 which applies a predetermined constant correction to compensate for phase lag inherent in the system. The frequency and phase of the photocell signal will vary in dependence upon the misalignment, if any, between the mean position of the slits on the screen 32 and the illumination pattern projected onto the screen. This is compared in the phase-sensitive rectifier 92 with the reference voltage frequency and phase and any resultant error signal is then directed by way of a search drive selector 98 and a DC pre-amplifier 100 to a DC power amplifier 102 which provides driving power for a servomotor as selected by that one of a series of switching units 104*a*, 104*b*, 104*c*, 104*d* associated with the respective photocell circuits. Each servomotor is coupled to a tachometer generator, all the generator units being indicated by a common reference number 106, and the output from an excited generator 106 is returned through amplifier 107 by the associated one of the switching units 104 to the power amplifier 102 operating the motor coupled to the generator to provide a stabilizing effect to eliminate hunting.

In the above description it is assumed that the actuating signal is being derived from the photocell output but this occurs only in a final positional adjustment because of the relatively limited field of search of the photoelectric microscopes. It is arranged that, before each setting operation, the motors locate the refractor blocks and the mask plate table in predetermined positions offset from the expected aligned positions and that when each setting operation is initiated a search unit 108 provides an actuating signal through the selector 98 to drive the motor or motors connected with that particular setting operation towards the expected positions of alignment. At this stage in the setting operation there will be no signal from the photocell 36 because the fiducial mark element will be outside the field of view of the vibratory screen. As the alignment position is approached, however, the oscillatory signal will be generated at the photocell as described above and this is sensed by a signal level detector 110 to provide an output therefrom which switches over the selector 98 to isolate the search unit 108 and provide further actuation of the driving motor by the processed photocell signal in the manner described above.

For the movement of the refractor blocks, each photocell operates respective refractor blocks independently of each other, as is indicated by the connections from the sensing units 104*a*, 104*b*, 104*c*, 104*d* to the pairs of motors 36*a*, 36*b*. In the table movement, however, the signals from the photocells must be grouped. Thus, the two photocells of the respective microscopes that are sensitive to the movement of the fiducial mark elements X directed parallel to the plane of FIG. 3 are fed through a summing unit 112 to provide a summated output to the servomotor 40*a* which displaces the carrier 6 in the X direction, i.e., parallel to the plane of FIG. 2. The servomotor 40*b* similarly receives from unit 114 a summated signal from the photocells sensitive to the other two fiducial mark elements Y to give displacements in the Y direction, i.e. parallel to the plane of FIG. 3. Angular corrections are applied by the servomotor 40*c* which responds to a difference signal derived by a subtraction unit 116 from the photocells sensing the positions of the two mark elements Y.

Reference has already been made to the effects of diffraction at the edges of a thin slit when a beam of light is directed onto the slit. With the order of circuit line thickness required for microcircuits (which may be between 0.01 mm and 0.004 mm or even less) and at the spacing distances provided in the illustrated apparatus, such diffraction effects may be observed in the illumination pattern falling on a workpiece from the mask plate. A result of this is that if there are lines of very different widths on the mask plate they may not have their different widths correspondingly reproduced on the workpiece because of the non-linear distribution of illumination across the width of the lines. By providing two mask plate loading stations 16*a*, 16*b*, and ensuring that accurate alignment can always be achieved between a mask plate and a workpiece, should this potential difficulty arise it is possible to reproduce a particular circuit layer in two separate stages from two mask plates in which the different width of circuit lines are divided into separate groups on the respective mask plates to be exposed independently of each other. By varying the exposure time of the different widths of line, i.e., by giving a longer exposure to the pattern on the mask plate carrying the thinner lines, it is possible to compensate for the different results that would otherwise be caused by the edge diffraction effects. It will be appreciated that this procedure could be modified to reproduce a pattern in three or more complementary parts on different mask plates, should this be necessary. It is to be appreciated that, although no specific description of sequencing means for controlling the movements of the different parts of the apparatus through a complete operational cycle from the loading to the unloading of the carriers, the required sequencing is readily adaptable to automatic control employing techniques that are themselves well known. If desired, such control could be co-ordinated with automatic feeding devices for the transport of workpieces and/or mask plates to and from the loading and reject stations of the apparatus.

It is also possible to employ the apparatus for the formation of beam-leads on a silicon slice, the use of photo-electric microscopes for alignment being particularly suitable for this process. The material of the beam-leads will be deposited on the silicon slice in the final microcircuit layer and the slice is returned to the carrier 4 in an inverted position. Silicon is transparent to transmissions having a wavelength of 1.1 to 1.2 microns and by providing such illumination in the photo-electric microscopes for the alignment process, reflected images can be received from the fiducial marks, even though they are now on the underside of the slice. The mask plate is then aligned to the slice in the manner previously described and it will be noted that the increased depth of focus that is a characteristic of photo-electric microscopes is used to good effect because of the increased spacing between the levels of the two sets of marks. The mask pattern will of course determine the area of silicon that is eventually to be etched at the margins of each microcircuit so that the beam-leads then project from the edges of the microcircuits.

While the invention has been particularly described above with reference to microcircuits, it can be applied to the production of other solid-state components, such as opto-electronic devices, e.g., photo-diodes.

What I claim and desire to secure by Letters Patent is:

1. Apparatus for producing a pattern from one planar element upon another planar element by the transmission of a collimated beam of radiant energy through said one element onto the other element and comprising, in combination, a support structure, respective mounting devices for the two elements located on said structure to maintain the elements in parallel planes out of contact with each other, photo-electric microscope means on said structure being disposed to sense fiducial marks on the elements, said microscope means comprising a device defining a datum position for the observed image pattern of said fiducial marks and optical elements adjustable in said microscope means to alter the transmission path of the image illumination pattern, sensing means connected to said microscope means to receive signals generated by misalignment of the observed image pattern from said datum position, said control means displacing said optical elements for location of the image pattern of a first of the planar elements to said datum position and displacing the mounting device of the second of the planar elements in a plane parallel to the planes of the two elements in dependence upon sensing signals from the microscope means to align the fiducial marks of the second element with those of the first element.

2. Apparatus according to claim 1 for use with planar elements each having fiducial marks in two laterally opposed regions, said microscope means comprising respective photoelectric microscopes for viewing said two regions, sensing means in the microscopes for determining relative misalignment between the marks of the two elements in the respective regions, servo means being disposed to connect operatively said sensing means and the last said device and optical elements to correct said misalignment.

3. Apparatus according to claim 1 wherein first and second illumination means are provided respectively for the production of said collimated beam and for said microscope means, the second illumination means being arranged to produce energy of a different wavelength to that of said first illumination means.

4. Apparatus according to claim 1 wherein respective loading stations are disposed on the structure for the planar elements and location means are provided at said stations to determine approximate locations for said elements thereon, respective transfer members being displaceably supported on the structure to bring the elements from said stations to their mounting devices and to place them on said devices in locations dependent upon their locations at said stations.

5. Apparatus according to claim 4 having static abutment elements at each loading station and a locating pressure element actuable to urge the planar element into registration with said abutment elements.

6. Apparatus according to claim 1 wherein a fluid-pressure bearing is provided in one of the mounting devices, an element-supporting face of the device carried by the bearing being tiltable through said bearing, said device having displacement means connected to it to urge it against its planar element when the element is in a predetermined planar orientation to pivot said bearing in order to adjust the planar disposition of said supporting face of the device to the predetermined orientation of said element, locking means being provided to secure the bearing against tilting movement of the supported face away from its adjusted planar disposition upon retraction of the mounting device with the element by further operation of said displacement means.

7. Apparatus according to claim 6 wherein displacement means are connected to the other mounting device to permit adjustment of its position in a plane parallel to the planes of the two elements.

8. Apparatus according to claim 1 wherein said microscope means consists of respective photo-electric microscopes at laterally opposite regions of the mounting device, objectives of said microscopes being locatable in positions over the mounting devices to observe said fiducial marks, illumination means for the production of said collimated beam being mounted above the extended positions of said microscope objectives and the objectives being outwardly displaceable from said observation positions away from the path for the transmission of said collimated beam from said illumination means to the planar elements.

9. Apparatus according to claim 1 wherein optical means are disposed on said structure for interposition in the light path between the planar elements and the photo-electric microscope means to set to a common value the optical spacing relative to the microscope means of the fiducial marks on corresponding portions of the respective planar elements.

10. Apparatus according to claim 9 wherein respective transfer members are displaceably supported on the structure for movement of the planar elements to and from their mounting devices, transparent elements being provided on one of the transfer members through which the fiducial marks of the planar element it carries can be viewed, said transparent elements being arranged to alter the effective optical length of the line of sight therethrough between each microscope and said element to bring it substantially equal to the optical length between each microscope and the other planar element.

11. A method for reproducing a pattern from a first planar element upon a second planar element comprising the steps of placing the first element in a working position, deriving a location datum by sensing fiducial marks on the first element through photoelectric microscope means, adjusting the illumination routing through the microscope means to produce an image at a predetermined datum position, placing the second element in its approximate location in a plane parallel to the first element such that a spacing is maintained between the two elements, sensing fiducial marks on the second element through said adjusted illumination routing to detect misalignment between the sensed position of said marks and the location datum, employing said sensed misalignment to bring the second element marks towards said datum to correct said misalignment, and transmitting a collimated beam of radiant energy through one of the elements to produce a pattern thereon of the other of the elements.

12. A method according to claim 11 wherein the first element is urged against a reference surface parallel to said parallel planes and is secured in alignment with said reference surface, it then being displaced perpendicular to said parallel planes to determine the spacing between it and the second element.

13. A method according to claim 11 wherein linear, mutually perpendicular fiducial marks at each of two laterally opposite areas of each planar element are employed for determining said location datum and for aligning thereto.

14. A method according to claim 11 wherein the fiducial marks of the planar elements are in the form of linear depressions in a reflecting surface and each depression is employed to give an image in a photo-electric microscope means comprising a pair of bright lines, as determined by the edges of the depression, on a dark background.

15. A method according to claim 11 wherein the fiducial marks are observed using illumination of a wavelength to which a radiation-active coating on the element receiving said pattern reproduction is insensitive.

16. A method according to claim 11 wherein respective first planar elements are employed to reproduce on the second planar element a pattern comprising lines of different thicknesses, said pattern being divided into complementary parts in which different line thicknesses are grouped on different parts and each complementary part is disposed on a different first planar element, the second element being exposed successively to said first planar elements to build up the pattern from said complementary parts.

* * * * *